US011603438B2

(12) United States Patent
Jeol et al.

(10) Patent No.: US 11,603,438 B2
(45) Date of Patent: Mar. 14, 2023

(54) CROSS-LINKABLE POLYMER COMPOSITIONS

(71) Applicant: SOLVAY SPECIALTY POLYMERS USA, LLC, Alpharetta, GA (US)

(72) Inventors: Stéphane Jeol, Cumming, GA (US); David B. Thomas, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 889 days.

(21) Appl. No.: 16/342,615

(22) PCT Filed: Oct. 16, 2017

(86) PCT No.: PCT/EP2017/076271
§ 371 (c)(1),
(2) Date: Apr. 17, 2019

(87) PCT Pub. No.: WO2018/073139
PCT Pub. Date: Apr. 26, 2018

(65) Prior Publication Data
US 2019/0263982 A1 Aug. 29, 2019

Related U.S. Application Data

(60) Provisional application No. 62/410,016, filed on Oct. 19, 2016.

(30) Foreign Application Priority Data

Jan. 13, 2017 (EP) .................................... 17151498

(51) Int. Cl.
| | | |
|---|---|---|
| *C08J 3/24* | (2006.01) | |
| *C08G 65/40* | (2006.01) | |
| *C08G 65/48* | (2006.01) | |
| *C08K 3/40* | (2006.01) | |
| *C08K 5/5419* | (2006.01) | |
| *C08K 7/14* | (2006.01) | |
| *C08G 75/23* | (2006.01) | |

(52) U.S. Cl.
CPC .......... *C08J 3/247* (2013.01); *C08G 65/4068* (2013.01); *C08G 65/4093* (2013.01); *C08G 65/48* (2013.01); *C08K 3/40* (2013.01); *C08K 5/5419* (2013.01); *C08K 7/14* (2013.01); *C08G 75/23* (2013.01); *C08G 2650/40* (2013.01); *C08J 2371/08* (2013.01)

(58) Field of Classification Search
CPC ............... C07F 9/587; C07F 15/06; C09K 2211/1029; C09K 2211/1044; C09K 2211/187; C08J 3/247; C08J 2371/08; C08G 65/4068; C08G 65/093; C08G 65/48; C08G 75/23; C08G 2650/40; C08K 3/40; C08K 5/5419; C08K 7/14
See application file for complete search history.

(56) References Cited

U.S. PATENT DOCUMENTS

| | | |
|---|---|---|
| 4,093,600 A | 6/1978 | Fan |
| 4,812,519 A | 3/1989 | Gillette |
| 2009/0283476 A1 | 11/2009 | Schwab et al. |

FOREIGN PATENT DOCUMENTS

CA 853800 A 10/1970

OTHER PUBLICATIONS

Brode G. L., "Post Vulcanizing Thermoplastics I. Polysufone", Project Report—Union Carbide Corporation, 1968, p. 1-24, Bound Brook, New Jersey.

*Primary Examiner* — Shane Fang
(74) *Attorney, Agent, or Firm* — Beatrice C. Ortego

(57) ABSTRACT

Methods of cross-linking or chain extending a polymeric material including a silane-modified poly(arylene ether) polymer (Si-PAE) in a shaped article include heating the shaped article from a temperature $T_1$ to a temperature $T_2 > T_1$, while maintaining the temperature at which the shaped article is heated within a specified range based on the increasing Tg of the polymeric material during the heating. Shaped articles cross-linked or chain extended by the methods are also described.

15 Claims, No Drawings

CROSS-LINKABLE POLYMER COMPOSITIONS

CROSS-REFERENCE TO RELATED APPLICATIONS

This application claims priority to U.S. Provisional Application No. 62/410,016, filed Oct. 19, 2016, and European Application No. EP 17151498.7, filed Jan. 13, 2017, the entireties of which are incorporated herein by reference.

FIELD OF THE INVENTION

The present invention relates to methods of cross-linking or chain extending a polymeric material including a silane-modified poly(arylene ether) polymer (Si-PAE) in a shaped article, and shaped articles including the cross-linked or chain extended polymeric material.

BACKGROUND

Poly(arylene ether) polymers (PAE) such as poly(aryl ether sulfones) (PAES) and poly(aryl ether ketones) (PAEK) are high performance polymers used in a wide range of applications where there is a need for high temperature performance, good mechanical properties, and chemical resistance. There is, however, a need in several applications to improve their chemical resistance to common solvents such as acetone and chloroform, to increase the environmental stress cracking resistance, and/or to improve mechanical properties at various temperatures.

One approach involves introducing cross-links between the polymer chains at the correct time during processing. As most of the applications of PAE polymers require processing in the molten state to form shaped articles, for example, by extrusion or injection molding, it is necessary to use a cross-linkable system that can be initiated in the shaped article after melt processing at temperatures ranging from 300° C. to 400° C. Moreover, cross-linking needs to be accomplished without creating undesirable side effects in the shaped article such as, deformation, discoloration, or changes in density.

The shaped articles include a polymer composition including the polymeric material, and the polymeric material includes an Si-PAE, as described below.

For the sake of clarity, throughout the present application:
the term "glass transition temperature (Tg)" means the mid-point glass transition temperature (Tg) measured by differential scanning calorimetry (DSC) (first heat) employing a heating of 20° C./min from 40° C. to 300° C. When the polymeric material is a blend of miscible polymers, defined as blends having a dispersed phase ≤15 nm, the Tg of the polymeric material is the single Tg of the blend. When the polymeric material is an immiscible polymer blend, defined as blends having a dispersed phase >15 nm, the Tg of the polymeric material is the Tg of the Si-PAE of the blend;
the term "halogen" includes fluorine, chlorine, bromine, and iodine, unless indicated otherwise;
the adjective "aromatic" denotes any mono- or polynuclear cyclic group (or moiety) having a number of t electrons equal to 4n+2, where n is 1 or any positive integer; an aromatic group (or moiety) can be an aryl and arylene group (or moiety);
the term "chain extending" or "chain extended" means forming Si—O—Si bonds between Si-PAE polymers to increase both the number average molecular weight (Mn) and the weight average molecular weight (Mw) of the polymeric material by at least 10%, while retaining greater than 99% solubility of the polymeric material in methylene chloride.
the term "cross-linking" or "cross-linked" as used herein means the formation of Si—O—Si bonds between Si-PAE polymers such that at least 1 wt. % of the polymeric material is insoluble in methylene chloride.

Solubility in methylene chloride is determined by immersing 1 g of the polymeric material in methylene chloride for 2 hours at 23° C. with no stirring, followed by recovering, drying, and weighing of any insoluble polymeric material.

The Polymeric Material

The polymeric material includes an Si-PAE of formula (I):

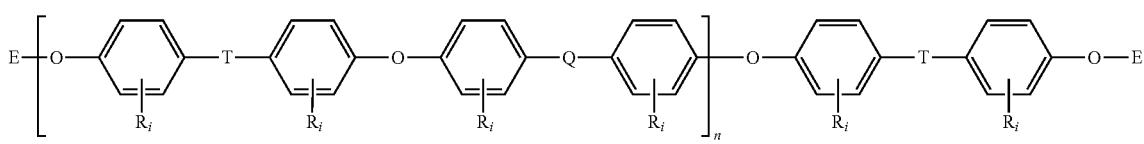

(I)

DETAILED DESCRIPTION OF PREFERRED EMBODIMENTS

It was surprisingly discovered that silane-modified poly(arylene ether) polymers (Si-PAE) in a shaped article can be cross-linked or chain extended using selected processing conditions that avoid the aforementioned undesirable effects observed with traditional cross-linking and chain extending methods such as, for example, bubble or blister formation, deformation or dimensional changes, or discoloration.

The methods involve heating a shaped article including the Si-PAE from a temperature $T_1$ to a temperature $T_2 > T_1$, while maintaining the temperature at which the shaped article is heated within a specified range based on the increasing Tg of the polymeric material during the heating.

Q is independently selected from the group consisting of a sulfone group [—S(=O)$_2$—] and a ketone group [—C(=O)—]. Preferably, all of Q are either a sulfone group or a ketone group. Most preferably, Q is at each instance a sulfone group.

T, equal to each other, is selected from the group consisting of a bond; —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—, where each R$^a$ and R$^b$, independently of one another, is a hydrogen or a C$_1$-C$_{12}$-alkyl, C$_1$-C$_{12}$-alkoxy, or C$_6$-C$_{18}$-aryl group; —(CH$_2$)$_p$— and —(CF$_2$)$_p$— with p being an integer from 1 to 6; an aliphatic divalent group, linear or branched, of up to 6 carbon atoms; and combinations thereof. Preferably, T is selected from the group consisting of a bond, —SO$_2$—, and —C(CH$_3$)$_2$—.

n is an integer ranging from 2 to 100, preferably from 2 to 50, most preferably from 2 to 40.

Each R is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium, an epoxy, a norbornene, an acrylate, an olefin, a silane, and a group E as described below. Preferably, R is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a silane, and a quaternary ammonium.

Each i is independently selected from an integer ranging from 0 to 4. Preferably i is zero.

Each E is independently selected from the group consisting of moieties of formula (II):

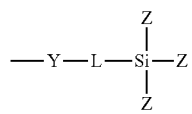

(II)

Each Z is independently selected from the group consisting of an alkyl, an alkoxy, and an —OH group, provided that at last one of Z, preferably all of Z, is an alkoxy or an —OH group. Preferably, Z is an alkoxy group or a methyl group, most preferably a methoxy —OCH$_3$ or ethoxy —OCH$_2$CH$_3$ group.

L is selected from the group consisting of a bond, an alkyl, an aryl, and an arylalkyl, where the alkyl, aryl, and arylalkyl are optionally substituted with one or more heteroatoms, preferably oxygen, nitrogen, sulfur or phosphorus.

Y is a selected from the group consisting of a —CH$_2$— and a —(C=O)NH— group, preferably a —CH$_2$— group.

In some embodiments, each E is independently selected from the group consisting of:

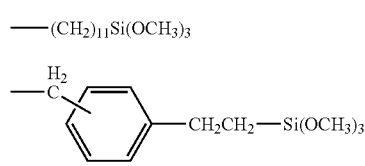

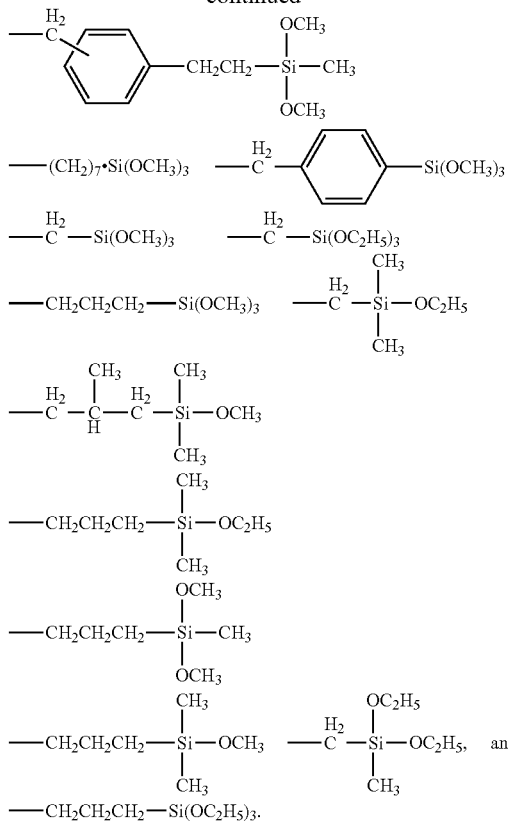

Preferably, each E is identical. Most preferably, each E is a propyltrimethoxysilane group. In some embodiments, no R is an E.

In some embodiments, Q is a sulfone group [—S(=O)$_2$—], T is selected from the group consisting of a bond, a sulfone group [—S(=O)$_2$—], and a —C(CH$_3$)$_2$— group, preferably a —C(CH$_3$)$_2$— group, and each i is zero.

The Si-PAE is preferably a silane-modified polysulfone (Si-PSU) of formula (III):

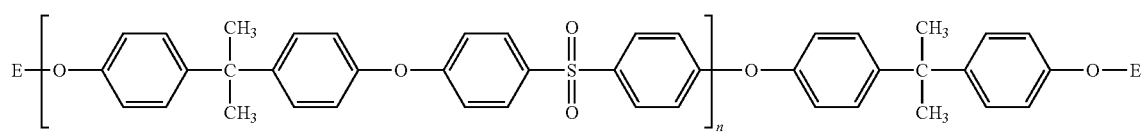

(III)

where E and n are as described above. Preferably each E is a propyltrimethoxysilane group. The polymeric material may include up to 100 microequivalents per gram, preferably less than 50 microequivalents per gram, even more preferably less than 25 microequivalents per gram of non-silane end groups, for example, halogen (chlorine, fluorine) and hydroxyl.

The Si-PAE can be prepared by known methods. For example, the synthesis of the Si-PSU is described in U.S. Pat. No. 4,093,600, filed Apr. 30, 1976, which is incorporated herein by reference.

The Si-PAE preferably represents at least 50 wt. %, 70 wt. %, 90 wt. %, and most preferably 100 wt. % of the polymeric material, based on the total weight of the polymeric material.

The polymeric material may include more than one Si-PAE or a blend of one or more Si-PAE with another polymer, preferably with a non-silane-modified poly(arylene ether) (PAE) such as a poly (aryl ether sulfone) (PAES) or a poly(aryl ether ketone) (PAEK).

The glass transition temperature (Tg) of the polymeric material before chain extension or cross-linking preferably ranges from 50° C. to 250° C., preferably from 100° C. to 225° C.

The Polymer Composition

The shaped article includes a polymer composition including the polymeric material. The polymeric material may represent at least 40 wt. %, 50 wt. %, 60 wt. %, 70 wt. %, 80 wt. %, 90 wt. %, and most preferably 100 wt. % of the polymer composition, based on the total weight of the polymer composition.

In some embodiments, the polymer composition includes a reinforcing filler, preferably selected from fibrous and particulate fillers. Preferably, the reinforcing filler is selected from mineral fillers, such as talc, mica, titanium dioxide, kaolin, calcium carbonate, calcium silicate, magnesium carbonate; glass fibers; carbon fibers, boron carbide fibers; wollastonite; silicon carbide fibers; boron fibers, graphene, carbon nanotubes (CNT), and the like.

The reinforcing filler may be present in the polymer composition in an amount of at least 5 wt. %, preferably at least 10 wt. %, more preferably at least 15 wt. %, based on the total weight of the polymer composition.

The reinforcing filler is also preferably present in an amount of at most 60 wt. %, more preferably at most 50 wt. %, still more preferably at most 40 wt. %, based on the total weight of the polymer composition.

In some embodiments, the polymer composition includes about 30 wt. % of the reinforcing filler, preferably glass fiber, based on the total weight of the polymer composition. According to some embodiments, the polymer composition is free of a fibrous filler. Alternatively the polymer composition may be free of a particulate filler. Preferably, the polymer composition is free of reinforcing fillers.

In some aspects, the polymer composition consists or consists essentially of the polymeric material or the polymeric material and a reinforcing filler; however, in other aspects, the polymer composition may include one or more additional ingredients.

The polymer composition may optionally include other ingredients such as a colorant such as a dye and/or a pigment such as titanium dioxide, zinc sulfide, zinc oxide, ultraviolet light stabilizers, heat stabilizers, antioxidants such as organic phosphites and phosphonites, acid scavengers, processing aids, nucleating agents, lubricants, flame retardants, a smoke-suppressing agents, an anti-static agents, anti-blocking agents, and/or conductivity additives such as carbon black.

When one or more additional ingredients are present, their total weight is preferably less than 20 wt. %, less than 10 wt. %, less than 5 wt. % and most preferably less than 2 wt. %, based on the total weight of polymer composition.

The polymer composition may be free of a cross-linking catalyst.

In some aspects, the polymer composition after crosslinking exhibits a tensile strength ranging from 50 MPa to 200 MPa, preferably from 60 MPa to 150 MPa, a tensile elongation at break ranging from 2.0 to 20%, preferably from 3 to 10% as measured according to ASTM D638, and/or no crazing after 24 h immersion in acetone under a stress of 6000 psi.

Cross-Linking or Chain Extending of Shaped Articles

Exemplary embodiments include methods of cross-linking or chain extending the polymeric material in a shaped article as described herein by heating the shaped article. The method of cross-linking or chain extending a shaped article includes heating the shaped article from a first temperature $T_1$ to a second temperature $T_2$, where $T_2$ is greater than $T_1$.

During the heating, the Tg of the polymeric material increases. It was discovered that maintaining the temperature at which the shaped article is heated within a specified range of the Tg of the polymeric material as the Tg increases unexpectedly produces cross-linked or chain extended shaped articles with reduction or elimination of undesirable side effects such as bubbles or blisters, or deformation, dimensional changes, or discoloration of the shaped article. Thus, the shaped article may be heated in a number of ways, provided that the temperature at which the shaped article is heated is maintained within the specified range relative to the Tg of the polymeric material at all times during the heating.

A variety of temperature profiles may be used. The heating can be performed with at least one heating step and can include increasing the heating temperature during one or more heating steps. In some embodiments, the at least one heating step may include an increasing temperature ramp. Preferably the temperature of the increasing temperature ramp is increased 0.5° C./h to 1.25° C./h. A step-wise temperature profile may also be used, where the shaped article is heated at a first temperature for a first time, and then the temperature is increased to a second temperature and maintained for a second time, etc. Some embodiments include heating the shaped article at a constant temperature for a time ranging from 10 to 30 hours, preferably from 15 to 25 hours, most preferably from 16 to 24 hours. The shaped article may be heated for a total time ranging from 1 to 100 hours. The use of temperature profiles including both temperature ramps and stepwise temperature increases is within the scope of the invention, and any temperature profile may be used, provided that the temperature is increased from $T_1$ to $T_2$ and maintained within the specified temperature range as the Tg of the polymeric material increases. Of course, at least a portion of the heating will include heating the shaped article to bring it within the specified temperature range.

The Tg of the polymeric material may increase during the heating by at least 5%, preferably by at least 10%, most preferably by at least 15% relative to the Tg of the polymeric material before heating. The Tg of a shaped article at a selected time during the heating can be predetermined by the use of test articles. For example, multiple identical shaped articles ("test articles") can be heated under the same conditions, preferably in the same oven. Each test article can be withdrawn from the oven at a distinct time during the heating its Tg can be measured by DSC after cooling to room temperature (23° C.). The measured Tg of the test article can be taken as the Tg of the shaped article at the corresponding time during the heating. Based upon the disclosure herein, a person of skill in the art will know how to implement other schemes for determining the Tg of the shaped article so that it can be heated to keep its temperature within the specified ranges about the Tg.

The specified range based on the Tg of the polymeric material is from Tg−20° C. to Tg+5° C., preferably from Tg−15° C. to Tg+5° C., from Tg−10° C. to Tg+5° C., from Tg−10° C. to Tg+4° C., from Tg−10° C. to Tg+3° C., most preferably from Tg−10° C. to Tg+2° C. of the polymeric material during cross-linking or chain extending. Accordingly, the first temperature $T_1$ is greater than or equal to Tg−20° C., preferably greater than or equal to Tg−10° C., but less than Tg+5° C., preferably less than Tg+4° C., Tg+3° C., Tg+2° C. The second temperature $T_2$ is greater than Tg−20° C., preferably greater than Tg−10° C., but less than or equal to Tg+5° C., preferably less than or equal to Tg+4° C., Tg+3° C., Tg+2° C.

It was discovered that maintaining the temperature at which the shaped article is heated below about Tg+5° C. unexpectedly produces cross-linked or chain extended shaped articles with reduction or elimination of undesirable side effects such as bubbles or blisters, or deformation, dimensional changes, or discoloration of the shaped article. Thus, each of the at least one heating steps heats the shaped article to a temperature not more than Tg+5° C., preferably not more than Tg+4° C., Tg+3° C., Tg+2° C.

The shaped article may be heated in an air oven and without any constraints on the shaped article in any dimension, i.e., without a mold or other device to limit or prevent changes in volume or bending of the shaped article. Preferably, the shaped article is heated at atmospheric pressure (about 760 mmHg) or in a vacuum.

After heating, the shaped article includes —Si—O—Si— bonds between the Si-PAE of the polymeric material. In some embodiments the weight average molecular weight (Mw) is increased by at least 10% after the heating. When cross-linked, at least 1 wt. %, preferably at least 50 wt. %, more preferably at least 75 wt. %, most preferably all of the polymeric material is insoluble in methylene chloride as determined by immersing 1 g of the polymeric material in methylene chloride for 2 hours at 23° C. with no stirring and recovering and drying the insoluble parts.

As discussed above, it was surprisingly discovered that the methods described herein produce cross-linked or chain extended shaped articles without undesirable side effects such as bubble or blister formation in or on the part, deformation or dimensional change of the shaped article, or discoloration such as yellowing.

Bubble inclusions in the shaped article are voids in the polymeric material that may be caused, for example, by generation of byproducts of cross-linking or chain extending reactions, for example methanol, ethanol or water. After cross-linking or chain extending, the shaped article is preferably free of bubble inclusions >0.5 mm, >100 μm, >10 μm in diameter, where the diameters of the bubble inclusions are measured by optical microscopy in the case of transparent polymer compositions and by x-ray tomography in the case of opaque polymer compositions. Most preferably, the shaped article is free of bubble inclusions. In other words, the cross-linking or chain extending does not form bubble inclusions in the shaped article >0.5 mm, >100 μm, >10 μm in diameter. Preferably the cross-linking or chain extending does not form any bubble inclusions in the shaped article.

Changes in dimension or deformation of a shaped article are particularly disadvantageous when the cross-linked or chain extended part will not be machined or further modified before use.

The methods described herein have unexpectedly been found to result in a dimensional change in the shaped article after cross-linking or chain extending of less than 5%, preferably less than 2%, most preferably less than 1%. To determine the dimensional change, a bar with a length of 127 mm, a width of 12.7 mm, and a height of 3.2 mm made of the of the same material as the shaped object is subjected to the same cross-linking or chain extending process as the shaped article. The bar is then measured, and the greatest percent change in any of the length, width, and height of the bar is considered the percent dimensional change of the shaped article. Most preferably the shaped article is free of dimensional change after cross-linking or chain extending.

The methods described herein have also unexpectedly been found to prevent deformation in the shaped article after cross-linking or chain extending, e.g. bending or twisting as determined by visual inspection. Preferably, the shaped article is free of deformation after cross-linking or chain extending.

Exemplary embodiments also include shaped articles including the above-described polymeric material cross-linked or chain extended as described above.

The shaped articles can be made from the polymer composition using any suitable melt-processing method. For example, they may be made by methods, including but not limited to, injection molding, extrusion molding, roto-molding, blow-molding, additive manufacturing (also known as 3D printing) such as Fused Filament Fabrication (FFF), Selective Laser Sintering (SLS), and Stereo Lithography (SLA), preferably extrusion molding or injection molding. In some embodiments, the shaped articles are not extrusion molded shaped articles. In alternative embodiments, the shaped articles are not injection molded shaped articles. Before being processed in the melt, the articles are preferably dried below 1000 ppm water, more preferably below 500 ppm water. Preferably, the melt processing temperature ranges from 150° C. to 350° C., more preferably from 200° C. to 300° C.

The cross-linked or chain-extended shaped articles may be used for applications including, but not limited to, plumbing connectors, wire and cable applications, medical devices, and parts for aerospace or smart device applications.

The invention will be herein after illustrated in greater detail in the following section by means of non-limiting examples.

EXAMPLES

Preparation of Cross-Linkable Polysulfone (Si-PSU) and Injection Molded Parts

The synthesis of the cross-linkable PSU was achieved by the process described in U.S. Pat. No. 4,093,600, by the reaction of 114.14 g (0.5 mol) of bisphenol A dissolved in a mixture of 247 g of dimethylsulfoxide (DMSO) and 319.6 g of monochlorobenzene (MCB) with an aqueous solution of 79.38 g of sodium hydroxide at 50.34%, followed by distillation of the water to generate a solution of bisphenol A sodium salt free from water by heating the solution up to 140° C. In the reactor was then introduced a solution of 133.7 g (0.466 mol) of 4,4'-dichlorodiphenyl sulfone in 133.7 g of MCB and the reaction mixture is heated up to 165° C. and maintained at this temperature for 90 min. The reaction mixture was then cooled to 115° C. Next was introduced 16.5 g of 3-chloropropyltrimethoxysilane and reacted at 115° C. for 1 hour to convert the sodium phenoxide end-groups into propyltrimethoxysilane end-groups. The reaction mixture was then diluted with 200 g of anhydride MCB and filtered under nitrogen pressure, and the clear polymer solution was then coagulated in anhydrous methanol. The white solid was filtered and dried under vacuum at 80° C. before being stored in a moisture free environment. GCP analysis performed in methylene chloride as a solvent and calibrated with polystyrene standards showed a number average molecular weight, Mn=11,700 g/mol and a weight average molecular weight, Mw=26,200 g/mol. Proton NMR analysis confirmed the functionalization of PSU with propyltrimethoxysilane end-groups. The midpoint glass transition temperature (Tg) of the cross-linkable polysulfone was found to be 160° C. using differential scanning calorimetry (DSC) analysis (first heat) performed at 20° C./min from 40° C. to 300° C.

ASTM-type V specimens were obtained by injection molding at 250° C. (temperature of the melt) in a mold regulated at 120° C. using the micro injection molder of a DSM Xplore® twin-screw extruder. After injection molding, the transparent parts were stored in aluminum sealed bags before use. The GCP analysis of the parts showed a slight increase in molecular weight distribution with Mn=12,000 g/mol and Mw=29,500 g/mol, but the cross-linkable polysulfone was still completely soluble in methylene chloride and had a lower Mn and Mw than the commercial polysulfone, Udel® PSU P1700 from Solvay Specialty Polymers USA, LLC (Mn=18,000 g/mol, Mw=65,000 g/mol, Tg=185° C.).

Cross-Linking of Injection Molded Parts

The parts were submitted to different conditions and cross-linking was evaluated by placing the parts in:
- hot water at atmospheric pressure;
- a hot 5 wt. % aqueous solution of acetic acid (AcOH);
- hot water under pressure in a Parr reactor; or
- in air at atmospheric pressure in a Yamato ADP-31 oven temperature-regulated according to various heating profiles described below.

The following visual observations were made after exposure of the parts to the previous conditions as shown below in Tables 1-3:
- Presence of defects such as bubbles greater than 0.5 mm inside the part or blisters at the surface.
- Deformation of the part (change in volume and/or bending)
- Increase in yellowness.

The cross-linking efficiency was analyzed by testing the solubility of the polymer in methylene chloride by immersing 1 g of the polymeric material in methylene chloride for 2 hours at 23° C. with no stirring.

TABLE 1

| Effect of Water: Cross-linking Trials by Immersion in Water or Acidic Water, at T<Tg | | | | |
|---|---|---|---|---|
| | C1 | C2 | C3 | C4 |
| Temperature (° C.) | 80 | 95 | 115 (under pressure) | 135/150 (under pressure) |
| Time (h) | 4 | 4 | 4 | 12/12 |
| Environment | $H_2O$/AcOH 95/5 | $H_2O$ | $H_2O$ | $H_2O$ |
| Solubility Test | Soluble | Soluble | Soluble | Insoluble |
| Mn/Mw (g/mol) | 12,000/ 29,600 | 12,000/ 29,400 | 11,800/ 30,000 | N/A |
| Aspect | unchanged | unchanged | unchanged | Opaque, increase in volume due to porous structure |
| Bubbles/blister | No | No | No | Yes |
| Deformation | No | No | No | Yes |
| Yellowing | No | No | No | No |

As shown by Comparative Examples C1, C2, and C3, when the parts were exposed to aqueous solutions or acidic solutions at temperatures lower than Tg−45° C., essentially no change in molecular weight was observed, indicating that the polymeric material of the parts was not chain extended or cross-linked.

As shown by Comparative Example C4, when the parts were exposed to a temperature from Tg−25° C. to Tg−10° C. in presence of water, cross-linking was observed, but the sample became opaque and increased in volume due to the generation of bubbles, which is not desirable.

TABLE 2

| Effect of Temperature: Cross-linking Trials in Air | |
|---|---|
| | C5 |
| Initial Tg ($Tg_{(i)}$) (° C.) | 160 |
| Temperature (° C.) | 170 ($Tg_{(i)}$ + 10° C.) |
| Time (h) | 48 |
| Environment | Air oven |
| Solubility Test | Insoluble |
| Mn/Mw (g/mol) | N/A |
| Aspect | Transparent with large bubble inclusions >0.5 mm |
| Bubbles/Blister | Yes |
| Deformation | Yes |
| Yellowing | No |
| Final Tg ($Tg_{(f)}$) (° C.) | 178 |

As shown in Comparative Example 5, when the part was exposed to a temperature T=$Tg_{(i)}$+10°) C, the reaction happened so quickly (sample cross-linked after 48 h) that the sample changed in dimension and bubbles of gas were generated and trapped in the final part. The final $Tg_{(f)}$=178° C. was closer to the Tg of a high molecular weight polysulfone (185° C.).

TABLE 3

| Cross-linking With a Temperature Profile | | | | |
|---|---|---|---|---|
| | C6 | 7 | 8 | 9 |
| Initial Tg ($Tg_{(i)}$) (° C.) | 160 | 160 | 160 | 160 |
| Temperature Profile | 150° C. to 185° C. at 1.75° C./h | 150° C. for 24 h, 155° C. for 24 h, 160° C. for 24 h, 160° C. to 167° C. at 0.7° C./h, 167° C. for 16 h | 150° C. to 158° C. at 1° C./h, 158° C. for 16 h (($Tg_{(o)}$) = 167° C.)*, 158° C. to 165° C. at 0.9° C./h, 165° C. for 16 h (($Tg_{(o)}$) = 169° C.), 165° C. to 171° C. at 0.5° C./h, 171° C. for 16 h ($Tg_{(o)}$) = 177° C.), 171° C. to 178° C. at 1° C./h | 150° C. to 160° C. at 0.8° C./min, 160° C. for 16 h, 160° C. to 170° C. at 1.25° C./h, 170° C. for 16 h ($Tg_{(o)}$) = 177° C.), 170° C. to 179° C. at 1.1° C./h, 179° C. for 16 h ($Tg_{(o)}$) = 177° C.), 179° C. to 185° C. at 0.75° C./h, 185° C. for 16 h |

TABLE 3-continued

Cross-linking With a Temperature Profile

|  | C6 | 7 | 8 | 9 |
|---|---|---|---|---|
| Environment | Air | Air | Air | Air |
| Solubility test | Partially Soluble | Insoluble | Insoluble | Insoluble |
| Aspect | Bending | Unchanged | Unchanged | Unchanged |
| Bubbles/Blister | No | No | No | No |
| Deformation | Yes | No | No | No |
| Yellowing | No | No | No | No |
| Final Tg (Tg$_{(f)}$) (° C.) | 169 | 173 | 177 | 184 |

*Tg$_{(f)}$ is the intermediate Tg of the polymeric material subsequent to the associated heating described in Table 3. For instance, in Example 8, the Tg of the polymeric material was 167° C. following heating of the sample at an oven temperature from 150° C. to 158° C. at 1° C./h, and then at 158° C. for 16 h.

As shown in Comparative Example 6, when the part was submitted to a relatively quick increase in temperature from Tg$_{(i)}$−10=150° C. to Tg$_{(f)}$+16=185° C., the final Tg$_{(f)}$ only reached 169° C. and the parts exhibited undesirable deformation (bending). The up to Tg$_{(f)}$+16° C. caused deformation of the part.

As shown in Examples 7, 8, and 9, when the parts were heated at temperatures T chosen from Tg−20≤T≤Tg+5, the reaction unexpectedly proceeded without causing any blistering, deformation, or yellowing of the parts to yield a cross-linked product. In addition, this process did not require a mold or pressure to maintain the shape of the parts and avoid bending or blistering.

TABLE 4

Properties of Parts Before and After Cross-linking, and Comparison to Commercial Polysulfone

|  | C10 Udel® PSU P1700 | C11 Cross-linkable polysulfone (not cross-linked) | 8 | 9 |
|---|---|---|---|---|
| Tensile modulus (MPa) | 2,300 | 2,400 | 2,400 | 2,400 |
| Tensile strength at yield (MPa) | 70.3 | 69.0 | 84.8 | 82.7 |
| Elongation at yield (%) | 6.2 | 5.8 | 6.5 | 6.3 |
| Chemical resistance - immersion in acetone under a stress of 6000 psi | Breaks after <2 s | Breaks after <2 s | No crazing after 24 h | No crazing after 24 h |

After cross-linking, the parts from Examples 8 and 9 were insoluble in methylene chloride and exhibited good mechanical properties (increase in tensile strength of about 20% compared to non-cross-linked polysulfone or commercial Udel® PSU P1700 polysulfone). The cross-linked parts exhibited an exceptional resistance to acetone and resistance to aggressive solvents like acetone.

Example 10: Preparation of Cross-Linked Parts from Glass Filled Compounds of the Cross-Linkable PSU The cross-linkable PSU was blended in a twin-screw extruder with 30 wt. % glass fibers (OCV910 from Owens Corning) at 270° C. (temperature of the melt) to produce a strand that was cooled down to room temperature (23° C.) with air and pelletized into pellets. These pellets were immediately placed in an aluminum sealed bag and dried at 80° C. under vacuum overnight before injection molding.

The injection molding was performed at 250° C. (temperature of the melt) in a mold regulated at 120° C. to produce an ASTM Type I specimen. The cross-linking of the part was achieved by following the process of Example 9 with no dimensional change or appearance of bubble inclusions observed.

Before cross-linking, the part was very brittle, and after cross-linking the tensile strength was even higher than the commercial compound Udel® PSU GF-130 which is a polysulfone including 30% of glass fibers. After cross-linking, an increase in tensile strength was observed compared with both non-cross-linked and commercial polysulfone.

TABLE 5

Properties of Parts of Compounds Before and After Cross-linking, and Comparison to Commercial Polysulfone

|  | C12 (Udel® PSU GF-130) | C13 (Cross-linkable polysulfone compound) | 14 |
|---|---|---|---|
| Tensile modulus (MPa) | 8,690 | 7,200 | 7,000 |
| Tensile strength at break (MPa) | 108 | 63 | 119 |
| Elongation at break (%) | 2.0 | 1.0 | 3.4 |

Should the disclosure of any patents, patent applications, and publications which are incorporated herein by reference conflict with the description of the present application to the extent that it may render a term unclear, the present description shall take precedence.

The invention claimed is:

1. A method of cross-linking or chain extending a polymeric material in a shaped article, wherein the shaped article comprises a polymer composition comprising the polymeric material, the method comprising:
   heating the shaped article in at least one heating step in which the shaped article is heated in air from a first temperature T$_1$ to a second temperature T$_2$>T$_1$, such that the Tg of the polymeric material which is the mid-point glass transition temperature (Tg) of the polymeric material as measured by differential scanning calorimetry (DSC) (first heat) heating at 20° C/min from 40° C. to 300° C. at any time during the heating step increases during such heating step, wherein:
   the first temperature T$_1$ is greater than or equal to Tg$_{(i)}$−20° C. and less than Tg$_{(i)}$+5° C., said Tg$_{(i)}$ being the glass transition temperature of the polymeric material before such heating step, the second temperature T2 is greater than $Tg_{(t)}$ -20° C. and less than or equal to $Tg_{(t)}$+5° C., said $Tg_{(t)}$ being the glass transition temperature of the polymeric material subsequent to such associated heating step, and further wherein the polymeric material comprises a silane-modified poly(arylene ether) polymer (Si-PAE) of formula (I):

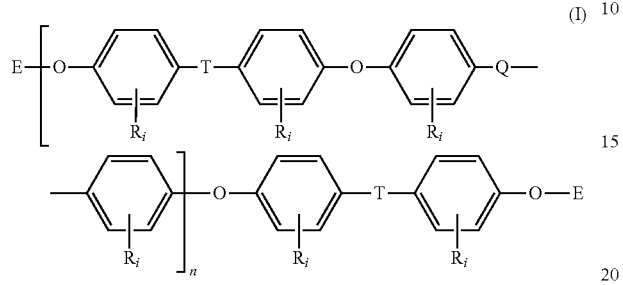

wherein:

Q is independently selected from the group consisting of a sulfone group [—S(=O)$_2$—] and a ketone group [—C(=O)—];

T, equal to each other, is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—, where each R$^a$ and R$^b$, independently of one another, is a hydrogen or a C$_1$-C$_{12}$-alkyl, C$_1$-C$_{12}$-alkoxy, or C$_6$-C$_{18}$-aryl group; —(CH$_2$)$_p$— and —(CF$_2$)$_p$— with p being an integer from 1 to 6; an aliphatic divalent group, linear or branched, of up to 6 carbon atoms; and combinations thereof;

n is an integer ranging from 2 to 100;

each R is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium, an epoxy, a norbornene, an acrylate, an olefin, a silane, and a group E;

each i is independently selected from an integer ranging from 0 to 4;

each E is independently selected from the group consisting of moieties of formula (II):

wherein:

each Z is independently selected from the group consisting of an alkyl, an alkoxy, and an —OH group, provided that at last one of Z is an alkoxy or an —OH group;

L is selected from the group consisting of a bond, an alkyl, an aryl, and an arylalkyl, wherein the alkyl, aryl, and arylalkyl are optionally substituted with one or more heteroatoms; and Y is a selected from the group consisting of a —CH$_2$— and a —(C=O)NH— group.

2. The method of claim 1, wherein:
the first temperature $T_1$ is greater than or equal to $Tg_{(i)}$-10° C. and less than $Tg_{(i)}$+2° C., said $Tg_{(i)}$ being the glass transition temperature of the polymeric material before such heating step, the second temperature $T_2$ is greater than $Tg_{(t)}$-10° C. and less than or equal to $Tg_{(t)}$ +2° C., said $Tq_{(t)}$ being the glass transition temperature of the polymeric material subsequent to such associated heating step.

3. The method of claim 1, wherein:
Z are independently selected from the group consisting of methyl, methoxy, and ethoxy groups, and
Y is a —CH$_2$— group.

4. The method of claim 1, wherein each E is independently selected from the group consisting of :

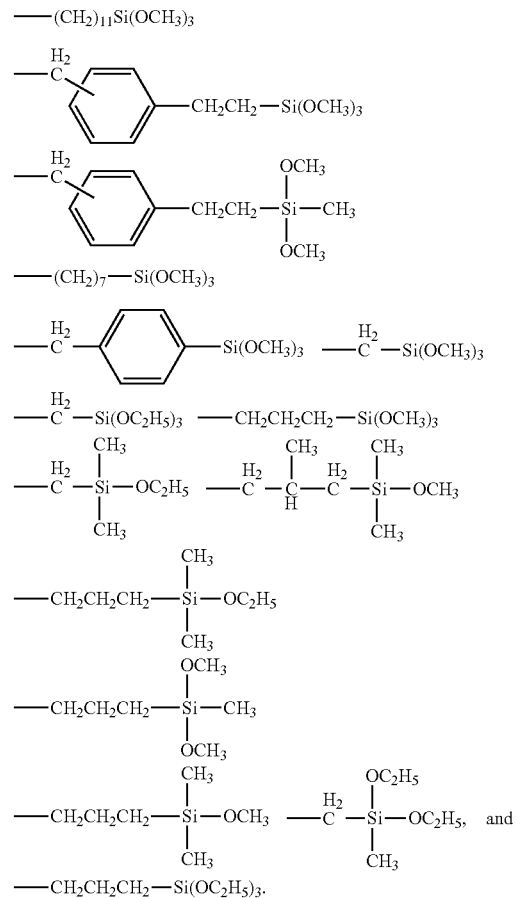

5. The method of claim 1, wherein each E represents a group of formula:

—CH$_2$CH$_2$CH$_2$—Si(OCH$_3$)$_3$.

6. The method of claim 1, wherein:
Q is a sulfone group [—S(=O)$_2$—],
T is selected from the group consisting of a bond, a sulfone group [—S(=O)$_2$—], and a —C(CH$_3$)$_2$— group, preferably a —C(CH$_3$)$_2$— group, and each i is 0.

7. The method of claim 1, wherein the Tg increases during the heating at least 5%, relative to the Tg of the polymeric material before the heating.

8. The method of claim 1, wherein the shaped article is heated for a total time ranging from 1 to 100 hours.

9. The method of claim 1, wherein the polymeric material comprises at least 70 wt. % of the silane-modified poly(arylene ether) polymer (Si-PAE).

10. The method of claim 1, wherein after the heating, at least 1 wt. % of the polymeric material is insoluble in methylene chloride as determined by immersing 1 g of the polymeric material in methylene chloride for 2 hours at 23° C. with no stirring.

11. The method of claim 1, wherein the shaped article is free of constraints in any dimension during the heating.

12. The method of claim 1, wherein the at least one heating step does not form bubble inclusions in the shaped article greater than 0.5 mm in diameter.

13. The method of claim 1, comprising maintaining the temperature at which the shaped article is heated within the specified temperature range based on the increasing Tg of the polymeric material during the heating step.

14. The method of claim 1, wherein the temperature is increased in the at least one heating step with a temperature ramp ranging from 0.5° C/h to 1.25° C/h or by stepwise temperature increases.

15. The method of claim 1, comprising several heating steps.

* * * * *